United States Patent
Okada et al.

(10) Patent No.: US 12,325,794 B2
(45) Date of Patent: *Jun. 10, 2025

(54) SILICONE RUBBER-BASED CURABLE COMPOSITION, STRUCTURE, WEARABLE DEVICE, AND METHOD FOR MANUFACTURING STRUCTURE

(71) Applicant: SUMITOMO BAKELITE CO., LTD., Tokyo (JP)

(72) Inventors: Jun Okada, Tokyo (JP); Yumiko Yamanoi, Tokyo (JP); Motoki Sato, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 821 days.

This patent is subject to a terminal disclaimer.

(21) Appl. No.: 17/434,765

(22) PCT Filed: Jan. 30, 2020

(86) PCT No.: PCT/JP2020/003514
§ 371 (c)(1),
(2) Date: Aug. 30, 2021

(87) PCT Pub. No.: WO2020/183970
PCT Pub. Date: Sep. 17, 2020

(65) Prior Publication Data
US 2022/0135800 A1    May 5, 2022

(30) Foreign Application Priority Data

Mar. 8, 2019 (JP) .................................. 2019-042425

(51) Int. Cl.
*C08L 83/04* (2006.01)
*C08G 77/04* (2006.01)
*C08G 77/20* (2006.01)

(52) U.S. Cl.
CPC .............. *C08L 83/04* (2013.01); *C08G 77/04* (2013.01); *C08G 77/20* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 5,008,305 | A * | 4/1991 | Kennan | C09C 1/3081 106/490 |
| 5,770,140 | A * | 6/1998 | Muller | C08K 5/14 264/347 |
| 2013/0331821 | A1* | 12/2013 | Okada | C09C 1/3081 604/525 |
| 2014/0018464 | A1* | 1/2014 | Senoo | A61L 29/042 523/105 |
| 2014/0242312 | A1* | 8/2014 | Murai | C08J 3/246 428/35.8 |

FOREIGN PATENT DOCUMENTS

| | | | | |
|---|---|---|---|---|
| EP | 2845880 | | 4/2019 | |
| JP | 10-158518 | | 6/1998 | |
| JP | 2015-052027 | | 3/2015 | |
| JP | 2016-002103 | | 1/2016 | |
| JP | 2018-070866 | | 5/2018 | |
| JP | 2018076484 | A * | 5/2018 | ............. B41J 2/345 |
| JP | 2018-09774 | A * | 6/2018 | ............. C08L 83/04 |
| JP | 2018-090774 | | 6/2018 | |
| KR | 19980010612 | U * | 8/1996 | |

OTHER PUBLICATIONS

Lee, "Electrical and Mechanical Properties of Silicone Rubber for High Voltage Insulation", Proceedings of the 7th International Conference on Properties and Applications of Dielectric Materials Jun. 1-5, 2003 Nagoya, pp. 591-594 (Year: 2003).*
Machine translation of JP 2018076484 A, retrieved Jul. 2024 (Year: 2024).*
Machine translation of KR 19980010612 U (Year: 1998).*
International Search Report and Written Opinion for International Application No. PCT/JP2020/003514 mailed on Mar. 24, 2020, 12 pages.

* cited by examiner

*Primary Examiner* — Katarzyna I Kolb
(74) *Attorney, Agent, or Firm* — Amin, Turocy & Watson, LLP

(57) ABSTRACT

A silicone rubber-based curable composition according to the present invention includes an organopolysiloxane including a vinyl group-containing organopolysiloxane (A), and an inorganic filler including silica particles (C), in which in a $^1$H-NMR spectrum of the silicone rubber-based curable composition, a first peak derived from a vinyl group is present, a vinyl group index is equal to or less than 3.5× $10^{-1}$% by mole, and a content of the inorganic filler satisfies a range of equal to or more than 5 parts by weight and equal to or less than 60 parts by weight with respect to 100 parts by weight of the organopolysiloxane.

15 Claims, No Drawings

SILICONE RUBBER-BASED CURABLE COMPOSITION, STRUCTURE, WEARABLE DEVICE, AND METHOD FOR MANUFACTURING STRUCTURE

TECHNICAL FIELD

The present invention relates to a silicone rubber-based curable composition, a structure, a wearable device, and a method for manufacturing a structure.

BACKGROUND ART

Various developments in a silicone rubber have hitherto been made. As a technique in such a field, for example, the technique described in Patent Document 1 is known. Patent Document 1 describes a silicone rubber composition including dimethylpolysiloxane having a dimethylvinylsiloxy group, dimethylpolysiloxane having vinylmethylsiloxane units in an amount of 10% by mole of all diorganopolysiloxane units in a main chain, and a resinous copolymer having an alkenyl group (Example 2 of Patent Document 1).

RELATED DOCUMENT

Patent Document

[Patent Document 1] Japanese Laid-open patent publication No. 2015-52027

SUMMARY OF THE INVENTION

Technical Problem

However, as a result of investigations conducted by the present inventors, it was found that there is room for improvement in mechanical strength and bending durability of a cured product of the silicone rubber composition described in Patent Document 1.

Solution to Problem

After further investigations, the present inventors have thus obtained new findings on a method for measuring a vinyl group index in a silicone rubber-based curable composition, and have found that it is possible to improve the mechanical strength and the ease of deformation in a molded product of a silicone rubber-based curable composition including a vinyl group-containing polyorganosiloxane and an inorganic filler by appropriately controlling the vinyl group index and the content of the inorganic filler in the silicone rubber-based curable composition, thereby leading to completion of the present invention.

According to the present invention,
there is provided a silicone rubber-based curable composition including:
an organopolysiloxane including a vinyl group-containing organopolysiloxane (A); and
an inorganic filler including silica particles (C),
in which in a $^1$H-NMR spectrum of the silicone rubber-based curable composition obtained in accordance with the following procedure, a first peak derived from a vinyl group is present,
a vinyl group index in the silicone rubber-based curable composition, as calculated in accordance with the following procedure, is equal to or less than $3.5 \times 10^{-1}$% by mole, and
a content of the inorganic filler is equal to or more than 5 parts by weight and equal to or less than 60 parts by weight with respect to 100 parts by weight of the organopolysiloxane.

Procedure

A $^1$H-NMR spectrum is obtained using a sample prepared from the silicone rubber-based curable composition.

Based on the obtained $^1$H-NMR spectrum, an integrated value (P1) of the first peak derived from a vinyl group and an integrated value (P2) of the second peak derived from a methyl group are calculated, and the vinyl group index (% by mole) is calculated from a formula: $P1/(P1+(P2-P1)/2)] \times 100$, using the calculated integrated values P1 and P2.

Moreover, according to the present invention, there is provided a structure including a cured product of the silicone rubber-based curable composition.

Furthermore, according to the present invention,
there is provided a wearable device having a clothes mounting section mountable on clothes,
in which the clothes mounting section is formed of a cured product of the silicone rubber-based curable composition.

In addition, according to the present invention,
there is provided a method for manufacturing a structure,
including a step of curing the silicone rubber-based curable composition, and
a step of obtaining a structure including a cured product of the silicone rubber-based curable composition.

Advantageous Effects of Invention

According to the present invention, there is provided a silicone rubber-based curable composition which can realize a molded product having excellent mechanical strength and bending durability, a structure, a wearable device, and a method for manufacturing a structure.

DESCRIPTION OF EMBODIMENTS

Hereinafter, embodiments of the present invention will be described with reference to drawings. Further, in all drawings, similar components are designated by the same reference numerals, and description thereof will not be repeated as appropriate. In addition, the drawings are schematic views and do not match actual dimensional ratios.

An overview of the silicone rubber-based curable composition of the present embodiment will be described.

The silicone rubber-based curable composition of the present embodiment includes an organopolysiloxane including a vinyl group-containing organopolysiloxane (A) and an inorganic filler including silica particles (C). In the silicone rubber-based curable composition, in a $^1$H-NMR spectrum of the silicone rubber-based curable composition obtained in accordance with the following procedure, a first peak derived from a vinyl group is present, a vinyl group index in the silicone rubber-based curable composition, as calculated in accordance with the following procedure, is equal to or less than $3.5 \times 10^{-1}$% by mole, and a content of the inorganic filler is equal to or more than 5 parts by weight and equal to or less than 60 parts by weight with respect to 100 parts by weight of the organopolysiloxane.

Procedure

A $^1$H-NMR spectrum is obtained using a sample prepared from the silicone rubber-based curable composition.

Based on the obtained $^1$H-NMR spectrum, an integrated value (P1) of the first peak derived from a vinyl group and an integrated value (P2) of the second peak derived from a methyl group are calculated, and the vinyl group index (% by mole) is calculated from a formula: P1/(P1+(P2−P1)/2)]× 100, using the calculated integrated values P1 and P2.

According to the investigations conducted by the present inventors, it was found that the characteristics of a molded product formed of a silicone rubber-based curable composition can be evaluated more stably by using a vinyl group index in the silicone rubber-based curable composition as a guideline.

In a method for measuring the vinyl group index, the NMR measurement conditions used for the vinyl group-containing organopolysiloxane (A) itself could not be directly applied to the NMR measurement conditions for a composition (kneaded product). It is necessary to investigate appropriate dissolution conditions for the composition and prepare a measurement solution. As a result of intensive investigations conducted by the present inventors, it was newly found that the vinyl group index in the silicone rubber-based curable composition can be measured by appropriately selecting the dissolution conditions for the composition, as described later.

As a result of a progress of the investigations study using the method for measuring a vinyl group index according to the present embodiment, it was found that, for example, in a case where the vinyl group index is at an excessively high level, the durability and the tear strength against repeated bending deformation are lowered, and in a case where the vinyl group index is at an excessively low level, there is a risk that the strength of a member may be lowered.

In contrast, it was found that the mechanical strength and the bending durability of a silicone rubber-based curable composition in a molded product can be improved by setting a content of an inorganic filler within an appropriate range and setting the vinyl group index within an appropriate range.

In addition, it was also found that it is possible further enhance the durability against repeated bending deformation by making the silica content relatively low.

A detailed mechanism thereof is not clear, but is considered to be as follows: since a crosslinking point and a crosslinking density can be appropriately controlled by suppressing a vinyl group index to a relatively low level along with a content of an inorganic filler, the crosslinking state is adjusted to be appropriate, and the durability during repeated bending can be enhanced while suppressing a decrease in the mechanical strength.

The upper limit of the vinyl group index in the silicone rubber-based curable composition may be equal to or less than $3.5 \times 10^{-1}$% by mole, preferably equal to or less than $3.0 \times 10^{-1}$% by mole, more preferably equal to or less than $2.0 \times 10^{-1}$% by mole, still more preferably equal to or less than $1.0 \times 10^{-1}$% by mole, and even still more preferably equal to or less than $8.0 \times 10^{-2}$% by mole, or equal to or less than $1.0 \times 10^{-2}$% by mole. Thus, the bending durability during repeated bending can be improved. In a case where the content of the inorganic filler is relatively low, the tear strength can be further enhanced.

On the other hand, the lower limit of the vinyl group index may be, for example, equal to or more than $1.0 \times 10^{-3}$% by mole, or equal to or more than $2.0 \times 10^{-3}$% by mole. Thus, the mechanical strength can be improved.

In the present embodiment, a method for measuring the vinyl group index using a $^1$H-NMR spectrum may be adopted as follows.

The silicone rubber-based curable composition is used as a sample.

The sample is put into the following measurement solvent to prepare a solution at the following sample concentration.

The obtained solution is left to stand overnight or longer in an environment of room temperature (25° C.)

The solution that has been left to stand is stirred or sonicated at 50° C. for 2 hours or longer to obtain a measurement solution formed by dissolving the sample in the measurement solvent.

A $^1$H-NMR spectrum is obtained according to the following measurement conditions, using the obtained measurement solution.

Device: JEOL JNM-ECA 400 FT-NMR device
Measurement solvent: Deuterated chloroform
Sample concentration: About 5%
Measurement temperature: 40° C.
Cumulative number of times: 1024
Reference peak: Chloroform is set to 7.26 ppm Based on the obtained spectrum, the presence or absence of the first peak derived from the vinyl group is confirmed.

Furthermore, the integrated value (P1) of the first peak (5.6 to 6.0 ppm) derived from the vinyl group and the integrated value (P2) of the second peak (−0.1 to 0.1 ppm) derived from the methyl group are calculated.

The vinyl group index (% by mole) in the silicone rubber-based curable composition is calculated from a formula: [P1/(P1+(P2−P1)/2)]×100, using the calculated integrated values P1 and P2.

In the formula, the vinyl group index (% by mole) in the silicone rubber-based curable composition can be approximately calculated using polyorganosiloxane provided with the following structure models (i) to (iii).

Structure Models (I) A siloxane having a vinyl group is used as vinylmethylsiloxane (one vinyl group, one methyl group).

(ii) A siloxane having no vinyl group is used as dimethylsiloxane (two methyl groups).

(iii) One vinyl group is used with respect to one unit (structural unit) of a siloxane having a vinyl group.

The structure models are used to simply calculate a vinyl group index based on a $^1$H-NMR spectrum, and are not limited to the vinyl group-containing organopolysiloxane (A) included in the silicone rubber-based curable composition.

P1 in the formula indicates the number of units of vinylmethylsiloxane.

Among the methyl groups, the same number of methyl groups as that of the vinyl groups are bonded to vinylmethylsiloxane. In a case where such an amount of methyl groups are excluded, the number of methyl groups in dimethylsiloxane is represented by (P2−P1). Further, since two methyl groups are bonded to one siloxane, (P2−P1)/2 obtained by dividing (P2−P1) by 2 indicates the number of dimethylsiloxane units.

By the formula, the vinyl group index in the silicone rubber-based curable composition can be calculated with relatively high accuracy, based on the number of vinylmethylsiloxane units/(the number of vinylmethylsiloxane units+the number of dimethylsiloxane units).

The content of the inorganic filler in the silicone rubber-based curable composition may be, for example, equal to or more than 10 parts by weight and equal to or less than 60 parts by weight with respect to 100 parts by weight of the total amount of the organopolysiloxane. The upper limit of the content of the inorganic filler is preferably equal to or less than 50 parts by weight, more preferably equal to or less than 35 parts by weight, and still more preferably equal to or less than 30 parts by weight. By making the content of such an inorganic filler relatively low, the ease of deformation can be further enhanced. In addition, a silicone rubber having a relatively high tear strength while having a low hardness of equal to or less than 35 parts by weight can be realized.

In addition, the vinyl group index in the silicone rubber-based curable composition is Cv (% by mole), and the weight-average molecular weight of the vinyl group-containing organopolysiloxane (A) is M×10$^6$.

At this time, the silicone rubber-based curable composition may be designed so that Cv and M satisfy the following relationship. The silicone rubber-based curable composition satisfies, for example, $1.0\times10^{-3} \leq Cv/M \leq 1.5$, preferably $8.0\times10^{-2} \leq Cv/M \leq 1.2$, and more preferably $5.0\times10^{-2} \leq Cv/M \leq 1.1$. By setting Cv/M to equal to or less than the upper limit, the bending durability and the tear strength can be improved.

In addition, the weight-average molecular weight Mw of the vinyl group-containing organopolysiloxane (A) may be, for example, equal to or more than $5.0\times10^4$ and equal to or less than $1.0\times10^6$, preferably equal to or more than $1.0\times10^5$ and equal to or less than $9.0\times10^5$, and more preferably equal to or more than $3.0\times10^5$ and equal to or less than $8.0\times10^5$.

The weight-average molecular weight (Mw)/number-average molecular weight (Mn) of the vinyl group-containing organopolysiloxane (A) may be, for example, equal to or more than 1.5 and equal to or less than 4.0, preferably equal to or more than 1.8 and equal to or less than 3.5, and more preferably equal to or more than 2.0 and equal to or less than 2.8. Furthermore, Mw/Mn is a dispersity indicating the width of a molecular weight distribution.

The weight-average molecular weight and the number-average molecular weight can be measured, for example, in terms of polystyrene in gel permeation chromatography (GPC) using chloroform as a developing solvent.

In the present embodiment, it is possible to control the vinyl group index and the Cv/M, and an elongation at break, a tear strength, and a hardness, each described later, for example, by appropriately selecting the type and blending amount of each component included in the silicone rubber-based curable composition, a method for preparing the silicone rubber-based curable composition, a method for manufacturing a silicone rubber, and the like. Among these, examples of factors for setting the vinyl group index and the Cv/M, and an elongation at break, a tear strength, and a hardness, each described later, to desired numerical ranges include the following methods: to use a vinyl group-containing linear organopolysiloxane (A1-1) having a relatively small amount of vinyl groups and having the vinyl groups only at terminals as the vinyl group-containing organopolysiloxane (A); and to make a reaction between a silane coupling agent (D) and the silica particles (C) more reliably proceed through adjustment of a timing and a ratio of the vinyl group-containing organopolysiloxane (A) to be added, a blending ratio of the silica particles (C), a specific surface area of the silica particles (C), surface modification of the silica particles (C) with the silane coupling agent (D), addition of water, or the like.

Next, the characteristics of the silicone rubber-based curable composition of the present embodiment will be described.

Measurement Conditions for Tear Strength

A crescent-shaped test piece is manufactured using a cured product of the silicone rubber-based curable composition, and for the obtained crescent-shaped test piece, a tear strength is measured at 25° C. in accordance with JIS K 6252 (2001).

The lower limit of the tear strength of the cured product of the silicone rubber-based curable composition is, for example, equal to or more than 25 N/mm, preferably equal to or more than 28 N/mm, more preferably equal to or more than 30 N/mm, still more preferably equal to or more than 33 N/mm, and even still more preferably equal to or more than 35 N/mm. Thus, the durability of the silicone rubber during repeated use can be improved. In addition, the scratch resistance and the mechanical strength of the silicone rubber can be improved. On the other hand, the upper limit of the tear strength is not particularly limited, but may be, for example, equal to or less than 70 N/mm, or equal to or less than 60 N/mm. Thus, various characteristics of the silicone rubber can be balanced.

Measurement Conditions for Elongation at Break

A dumbbell-shaped type-3 test piece is manufactured using a cured product of the silicone rubber-based curable composition, and for the obtained dumbbell-shaped type-3 test piece, an elongation at break is measured at 25° C. in accordance with JIS K 6251 (2004).

The lower limit of the elongation at break of the cured product of the silicone rubber-based curable composition may be, for example, equal to or more than 500%, preferably equal to or more than 800%, more preferably equal to or more than 900%, and still more preferably equal to or more than 1,000%. Thus, the high stretchability and the durability of the silicone rubber can be improved. On the other hand, the upper limit of the elongation at break is not particularly limited, but may be, for example, equal to or less than 2,000%, or equal to or less than 1,500%. Thus, various characteristics of the silicone rubber can be balanced.

Measurement Conditions for Durometer Hardness A

A sheet-shaped test piece is manufactured using a cured product of the silicone rubber-based curable composition, and for the obtained sheet-shaped test piece, a durometer hardness A is measured at 25° C. in accordance with JIS K 6253 (1997).

The upper limit of the durometer hardness A of a cured product of the silicone rubber-based curable composition is not particularly limited, but may be, for example, equal to or less than 60, preferably equal to or less than 55, and more preferably equal to or less than 50. Thus, it is possible to promote a balance of the curing physical properties of the silicone rubber. In addition, from the viewpoint of ease of deformation, the upper limit of the durometer hardness A may be equal to or less than 40, equal to or less than 45, or equal to or less than 30. Thus, it is possible to enhance the ease of deformation, which facilitates deformation such as bending and stretching in the silicone rubber.

On the other hand, the lower limit of the durometer hardness A is not particularly limited, but may be, for example, equal to or more than 10, preferably equal to or more than 20, and more preferably equal to or more than 25. Thus, the mechanical strength of the silicone rubber can be increased.

Measurement Conditions for Tensile Strength

A dumbbell-shaped type-3 test piece is manufactured using a cured product of the silicone rubber-based curable composition, and for the obtained dumbbell-shaped type-3 test piece, a tensile strength is measured at 25° C. in accordance with JIS K 6251 (2004).

The lower limit of the tensile strength of the cured product of the silicone rubber-based curable composition is, for example, equal to or more than 5.0 MPa, and may be preferably equal to or more than 6.0 MPa, equal to or more than 7.0 MPa, equal to or more than 8.0 MPa, or equal to or more than 12.0 MPa. Thus, the mechanical strength of the silicone rubber can be improved. In addition, a structure having excellent durability, which can endure repeated deformation, can be realized. On the other hand, the upper limit of the tensile strength is not particularly limited, but may be, for example, equal to or less than 25 MPa, or equal to or less than 20 MPa. Thus, various characteristics of the silicone rubber can be balanced.

The cured product (silicone rubber) of the silicone rubber-based curable composition of the present embodiment is formed into a molded product which has been processed and molded into various forms, depending on applications. The molded product may be molded into various shapes such as a sheet shape, a tubular shape, and a bag shape.

Since the silicone rubber-based curable composition has excellent durability against repeated bending modification, it can be suitably used for forming a molded product for a bendable member. The bendable member refers to a member that is repeatedly stressed in a bending direction in a use environment, for example. This bendable member may be used in a use environment where a stress is applied in a stretching direction.

Examples of the bendable member include a wearable device. That is, the silicone rubber-based curable composition can be suitably used for forming a part of a wearable device, that is, a part of an elastomer member or a bendable member included in the wearable device.

The wearable device is a wearable device that can be worn on a body or clothes, and preferably on a curved surface of the body or the clothes, and examples thereof include a medical sensor that detects phenomena from a living body, such as a heart rate, an electrocardiogram, a blood pressure, and a body temperature, a healthcare device, a foldable display, a stretchable LED array, a stretchable solar cell, a stretchable antenna, a stretchable battery, an actuator, and a wearable computer. It is possible to use the molded product as a member for forming an electrode, a wiring, a substrate, a movable member that is stretchable and bendable, an exterior member, and the like, which are used for such wearable devices.

The silicone rubber-based curable composition of the present embodiment can be used to form a bendable member (a wiring and/or a substrate in a wiring substrate) that constitutes a part of a wearable device having a wiring or wiring substrate and is repeatedly bendable.

In addition, by a sewing test for sewing to clothes, it was revealed that a molded product of the silicone rubber-based curable composition can be applied to a clothes mounting section in a wearable device even though the process is simple.

Thus, a wearable device that is mountable on clothes, and preferably sewable to clothes can be realized.

That is, an example of a wearable device has a mounting section that is mountable on clothes or a sewing section that is sewable to clothes, and the mounting section or the sewing section may be formed of a cured product (molded product) of the silicone rubber-based curable composition.

In addition, a structure including the cured product (molded product) of the silicone rubber-based curable composition can be used in various applications. Among the following applications, medical applications, robot applications, and electronic equipment applications are preferable, and robot applications and electronic equipment applications may be mentioned.

The structure including the cured product (silicone rubber) of the silicone rubber-based curable composition of the present embodiment can be used in, for example, medical applications such as medical instruments and equipment applications; automobile applications; robot applications such as industrial robots; electronic equipment applications: production equipment or daily use applications for an anti-vibration material, a seismic isolation material, a food hose, and the like; and roller members.

The silicone rubber of the present embodiment can constitute, for example, a part of a medical tube material; a sealing material; a packing material; a connector material; a key pad material; a drive mechanism; and a sensor, which are examples of the medical instruments and the equipment applications. For example, by applying a movable member made of a resin of the present embodiment to the medical tube, the medical tube is excellent in kink resistance, scratch resistance, insertability, and transparency, and is also excellent in resilience. In addition, examples of the medical tube include a medical catheter, a manipulator, and a lead.

The silicone rubber of the present embodiment can constitute, for example, a part of a drive mechanism such as a joint; a wiring mechanism such as a wiring cable and a connector; an operation mechanism such as a manipulator, which are examples of the robot applications such as an industrial robot.

The silicone rubber of the present embodiment can constitute, for example, a part of a stretchable wiring or wiring substrate, used for a wearable device which can be worn on a human body and the like; cables such as an optical fiber, a flat cable, a wiring structure, and a cable guide; and sensors such as a touch panel, a force sensor, an MEMS, and a seat sensor, which are examples of the electronic equipment applications.

In addition, the silicone rubber of the present embodiment can constitute a part of daily commodities having flexibility, extensibility, or foldability, such as packaging materials such as a gas barrier film; cooking utensils; hoses; fixing belts; switches; sheet materials; and packing materials.

The respective components of the silicone rubber-based curable composition of the present embodiment will be described in detail.

Vinyl Group-Containing Organopolysiloxane (A)

The silicone rubber-based curable composition of the present embodiment includes a vinyl group-containing organopolysiloxane (A). The vinyl group-containing organopolysiloxane (A) is a polymerization product that is a main component of the silicone rubber-based curable composition.

The vinyl group-containing organopolysiloxane (A) can include a vinyl group-containing linear organopolysiloxane (A1) having a linear structure.

The vinyl group-containing linear organopolysiloxane (A1) has a linear structure and contains a vinyl group, and the vinyl group serves as a crosslinking point during curing.

The vinyl group index of the vinyl group-containing linear organopolysiloxane (A1) is not particularly limited, but it is preferable that, for example, two or more vinyl groups are contained in the molecule and the vinyl group index is equal to or less than 15% by mole. Thus, the amount of vinyl groups in the vinyl group-containing linear organopolysiloxane (A1) is optimized, and a network with the respective components which will be described later can be reliably formed.

The degree of polymerization of the vinyl group-containing linear organopolysiloxane (A1) is not particularly limited, but is, for example, preferably in the range of about 1,000 to 10,000, and more preferably in the range of about 2,000 to 5,000.

Furthermore, the degree of polymerization may be calculated from a number-average molecular weight.

In the present specification, a term "to" is used to indicate that an upper limit value and a lower limit value are included in a range unless otherwise specified.

The specific gravity of the vinyl group-containing linear organopolysiloxane (A1) is not particularly limited, but is preferably in the range of about 0.9 to 1.1.

By using those having a degree of polymerization and a specific gravity, each in the ranges, as the vinyl group-containing linear organopolysiloxane (A1), the improvement of the heat resistance, the flame retardancy, the chemical stability, and the like of the obtained silicone rubber can be promoted.

The vinyl group-containing linear organopolysiloxane (A1) is particularly preferably one having a structure represented by Formula (1).

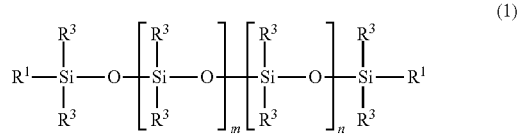

(1)

In Formula (1), $R^1$ is a substituted or unsubstituted alkyl group, alkenyl group, or aryl group having 1 to 10 carbon atoms, or a hydrocarbon group formed by the combination of these groups. Examples of the alkyl group having 1 to 10 carbon atoms include a methyl group, an ethyl group, and a propyl group, and among these, the methyl group is preferable. Examples of the alkenyl group having 1 to 10 carbon atoms include a vinyl group, an allyl group, a butenyl group, and among these, the vinyl group is preferable. Examples of the aryl group having 1 to 10 carbon atoms include a phenyl group.

In Formula (1), $R^2$ is a substituted or unsubstituted alkyl group, alkenyl group, or aryl group having 1 to 10 carbon atoms, or a hydrocarbon group formed by the combination of these groups. Examples of the alkyl group having 1 to 10 carbon atoms include a methyl group, an ethyl group, and a propyl group, and among these, the methyl group is preferable. Examples of the alkenyl group having 1 to 10 carbon atoms include a vinyl group, an allyl group, and a butenyl group. Examples of the aryl group having 1 to 10 carbon atoms include a phenyl group.

In Formula (1), $R^3$ is a substituted or unsubstituted alkyl group or aryl group having 1 to 8 carbon atoms, or a hydrocarbon group formed by the combination of these groups. Examples of the alkyl group having 1 to 8 carbon atoms include a methyl group, an ethyl group, and a propyl group, and among these, the methyl group is preferable. Examples of the aryl group having 1 to 8 carbon atoms include a phenyl group.

In addition, examples of the substituent of $R^1$ and $R^2$ in Formula (1) include a methyl group and a vinyl group, and examples of the substituent of $R^3$ include a methyl group.

Furthermore, in Formula (1), a plurality of $R^1$'s are independent of each other, and may be the same as or different from each other. Further, this shall apply to $R^2$ and $R^3$. In addition, in Formula (1), at least one of the plurality of $R^1$'s and $R^2$'s is an alkenyl group.

Furthermore, m and n are each the number of repeating units constituting the vinyl group-containing linear organopolysiloxane (A1) represented by Formula (1), m is an integer of 0 to 2,000, and n is an integer of 1,000 to 10,000. m is preferably 0 to 1,000, and n is preferably 2,000 to 5,000. Moreover, m+n is, for example, an integer of equal to or more than 1,000.

m and n each represent a degree of polymerization calculated using the number-average molecular weight Mn.

Moreover, examples of the specific structure of the vinyl group-containing linear organopolysiloxane (A1) represented by Formula (1) include one represented by Formula (1-1).

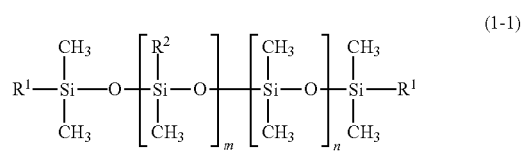

(1-1)

In Formula (1-1), $R^1$ and $R^2$ are each independently a methyl group or a vinyl group, and at least one of $R^1$ and $R^2$ is the vinyl group.

In the present specification, the vinyl group-containing linear organopolysiloxane (A1) in which only $R^1$ (terminal) is a vinyl group in the structure represented by Formula (1-1) is denoted as (A1-1), and the vinyl group-containing linear organopolysiloxane (A1) in which only $R^1$ (terminal) and $R^2$ (in the chain) are vinyl groups in the structure represented by Formula (1-1) is denoted as (A1-2).

The vinyl group-containing linear organopolysiloxane (A1) preferably contains a first vinyl group-containing linear organopolysiloxane (A1-1) (sometimes referred to as a "low-content vinyl group-containing linear organopolysiloxane (A1-1)") in which two or more vinyl groups are contained in the molecule and the vinyl group index is equal to or less than 0.1% by mole, and/or a second vinyl group-containing linear organopolysiloxane (A1-2) (sometimes referred to as a "high-content vinyl group-containing linear organopolysiloxane (A1-2)") in which the vinyl group index is more than 0.1% by mole to 15% by mole.

By combining the first vinyl group-containing linear organopolysiloxane (A1-1) having a low vinyl group index and the second vinyl group-containing linear organopolysiloxane (A1-2) having a high vinyl group index as a raw rubber which is a raw material of a silicone rubber, the vinyl groups can be unevenly distributed, and coarseness-and-fineness of the crosslinking density of the silicone rubber can be more effectively formed in the crosslinked network of the silicone rubber. As a result, the tear strength of the silicone rubber can be more effectively reliably enhanced.

Specifically, as the vinyl group-containing linear organopolysiloxane (A1), for example, the first vinyl group-containing linear organopolysiloxane (A1-1) including two or more of units in which $R^1$ is a vinyl group and/or units in which $R^2$ is a vinyl group in a molecule, in Formula (1-1), and having a vinyl group index of equal to or less than 0.1% by mole; and the second vinyl group-containing linear organopolysiloxane (A1-2) including two or more of units in which $R^1$ is a vinyl group and/or the units in which $R^2$ is a vinyl group in a molecule, and having a vinyl group index of more than 0.1% by mole to 15% by mole may be used.

Furthermore, the first and second vinyl group-containing linear organopolysiloxanes (A1-1) and (A1-2) may be used alone or in combination of two or more kinds thereof.

Organohydrogenpolysiloxane (B)

The silicone rubber-based curable composition of the present embodiment may include an organohydrogenpolysiloxane (B).

The organohydrogenpolysiloxane (B) is classified into a linear organohydrogenpolysiloxane (B1) having a linear structure and a branched organohydrogenpolysiloxane (B2) having a branched structure, and either one or both thereof can be included.

The linear organohydrogenpolysiloxane (B1) is a polymer which has a linear structure, further has a structure in which hydrogen is directly bonded to Si(≡Si—H), and undergoes a hydrosilylation reaction with a vinyl group contained in the components to be blended in the silicone rubber-based curable composition, other than the vinyl group of the vinyl group-containing organopolysiloxane (A), thereby crosslinking these components.

The molecular weight of the linear organohydrogenpolysiloxane (B1) is not particularly limited but, for example, the weight-average molecular weight is preferably equal to or less than 20,000, and more preferably equal to or more than 1,000 and equal to or less than 10,000.

Furthermore, the weight-average molecular weight of the linear organohydrogenpolysiloxane (B1) can be measured, for example, in terms of polystyrene in gel permeation chromatography (GPC) using chloroform as a developing solvent.

In addition, it is typically preferable that the linear organohydrogenpolysiloxane (B1) has no vinyl group. Thus, the progress of a crosslinking reaction in the molecule of the linear organohydrogenpolysiloxane (B1) can be reliably prevented.

As such a linear organohydrogenpolysiloxane (B1), for example, one having a structure represented by Formula (2) is preferably used.

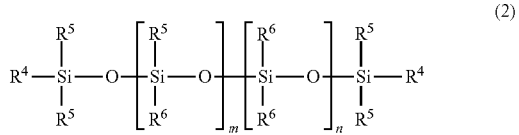

(2)

In Formula (2), $R^4$ is a substituted or unsubstituted alkyl group, alkenyl group, or aryl group having 1 to 10 carbon atoms, a hydrocarbon group formed by the combination of these groups, or a hydride group. Examples of the alkyl group having 1 to 10 carbon atoms include a methyl group, an ethyl group, and a propyl group, and among these, the methyl group is preferable. Examples of the alkenyl group having 1 to 10 carbon atoms include a vinyl group, an allyl group, and a butenyl group. Examples of the aryl group having 1 to 10 carbon atoms include a phenyl group.

In addition, $R^5$ is a substituted or unsubstituted alkyl group, alkenyl group, or aryl group having 1 to 10 carbon atoms, a hydrocarbon group formed by the combination of these groups, or a hydride group. Examples of the alkyl group having 1 to 10 carbon atoms include a methyl group, an ethyl group, and a propyl group, and among these, the methyl group is preferable. Examples of the alkenyl group having 1 to 10 carbon atoms include a vinyl group, an allyl group, and a butenyl group. Examples of the aryl group having 1 to 10 carbon atoms include a phenyl group.

Furthermore, in Formula (2), a plurality of $R^4$'s are independent of each other, and may be the same as or different from each other. This shall apply to $R^5$. It should be noted that at least two or more of the plurality of $R^4$'s and $R^5$'s are hydride groups.

In addition, $R^6$ is a substituted or unsubstituted alkyl group or aryl group having 1 to 8 carbon atoms, or a hydrocarbon group formed by the combination of these groups. Examples of the alkyl group having 1 to 8 carbon atoms include a methyl group, an ethyl group, and a propyl group, and among these, the methyl group is preferable. Examples of the aryl group having 1 to 8 carbon atoms include a phenyl group. A plurality of $R^6$'s are independent of each other, and may be the same as or different from each other.

Furthermore, examples of the substituent of $R^4$, $R^5$, and $R^6$ in Formula (2) include a methyl group and a vinyl group, and the methyl group is preferable from the viewpoint that the crosslinking reaction in the molecule is prevented.

In addition, m and n are each the number of repeating units constituting the linear organohydrogenpolysiloxane (B1) represented by Formula (2), m is an integer of 2 to 150, and n is an integer of 2 to 150. Preferably, m is an integer of 2 to 100 and n is an integer of 2 to 100.

Furthermore, the linear organohydrogenpolysiloxane (B1) maybe used alone or in combination of two or more kinds thereof.

The branched organohydrogenpolysiloxane (B2) is a component which forms an area having a high crosslinking density due to its branched structure, and thus greatly contributes to formation of coarse-and-fine structure of a crosslinking density in a system of a silicone rubber. In addition, the branched organohydrogenpolysiloxane (B2) is a polymer which has a structure in which hydrogen is directly bonded to Si(≡Si—H), and undergoes a hydrosilylation reaction with a vinyl group of the components to be blended in the silicone rubber-based curable composition, other than the vinyl group of the vinyl group-containing organopolysiloxane (A), thereby crosslinking these components, in the same manner as the linear organohydrogenpolysiloxane (B1).

In addition, the specific gravity of the branched organohydrogenpolysiloxane (B2) is in the range of 0.9 to 0.95.

Further, it is typically preferable that the branched organohydrogenpolysiloxane (B2) has no vinyl group. Thus, the progress of a crosslinking reaction in the molecule of the branched organohydrogenpolysiloxane (B2) can be reliably prevented.

In addition, as the branched organohydrogenpolysiloxane (B2), one represented by the following Average Composition Formula (c) is preferable.

$(H_a(R^7)_{3-a}SiO_{1/2})_m(SiO_{4/2})_n$     Average Composition Formula (c)

(In Formula (c), $R^7$ is a monovalent organic group, a is an integer in the range of 1 to 3, m is the number of $H_a(R^7)_{3-a}SiO_{1/2}$ units, and n is the number of $SiO_{4/2}$ units.)

In Formula (c), $R^7$ is a monovalent organic group, preferably a substituted or unsubstituted alkyl group or aryl group having 1 to 10 carbon atoms, or a hydrocarbon group formed by the combination of these groups. Examples of the alkyl group having 1 to 10 carbon atoms include a methyl group, an ethyl group, and a propyl group, and among these, the methyl group is preferable. Examples of the aryl group having 1 to 10 carbon atoms include a phenyl group.

In Formula (c), a is the number of hydride groups (hydrogen atoms directly bonded to Si), and is an integer in the range of 1 to 3, and preferably 1.

In addition, in Formula (c), m is the number of $H_a(R^7)_{3-a}SiO_{1/2}$ units, and n is the number of $SiO_{4/2}$ units.

The branched organohydrogenpolysiloxane (B2) has a branched structure. The linear organohydrogenpolysiloxane (B1) and the branched organohydrogenpolysiloxane (B2) are different in that the structures are linear and branched, respectively, and in a case where the number of Si is 1, the number of the alkyl groups R's bonded to Si (R/Si) is 1.8 to 2.1 for the linear organohydrogenpolysiloxane (B1) or 0.8 to 1.7 for the branched organohydrogenpolysiloxane (B2).

Moreover, since the branched organohydrogenpolysiloxane (B2) has a branched structure, the amount of residues in a case of heating to 1,000° C. at a temperature rising rate of 10° C./minute in a nitrogen atmosphere, for example, is equal to or more than 5%. On the other hand, since the linear organohydrogenpolysiloxane (B1) is linear, the amount of the residues after heating under the conditions is almost zero.

Moreover, specific examples of the branched organohydrogenpolysiloxane (B2) include one having a structure represented by Formula (3).

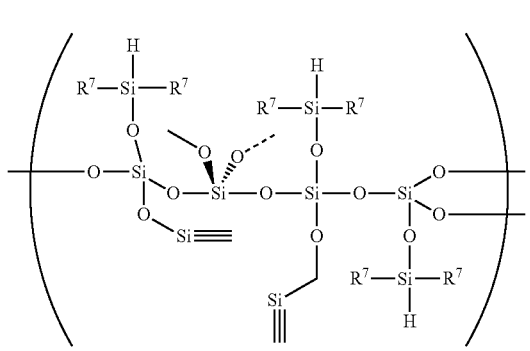

(3)

In Formula (3), $R^7$ is a substituted or unsubstituted alkyl group or aryl group having 1 to 8 carbon atoms, or a hydrocarbon group formed by the combination of these groups, or a hydrogen atom. Examples of the alkyl group having 1 to 8 carbon atoms include a methyl group, an ethyl group, and a propyl group, and among these, the methyl group is preferable. Examples of the aryl group having 1 to 8 carbon atoms include a phenyl group. Examples of the substituent of $R^7$ include a methyl group.

Furthermore, in Formula (3), a plurality of $R^7$'s are independent of each other, and may be the same as or different from each other.

In addition, in Formula (3), "—O—Si≡" denotes inclusion of a branched structure in which Si is diffused three-dimensionally.

Furthermore, the branched organohydrogenpolysiloxane (B2) may be used alone or in combination of two or more kinds thereof.

In addition, in the linear organohydrogenpolysiloxane (B1) and the branched organohydrogenpolysiloxane (B2), the amount of the hydrogen atoms (hydride groups) directly bonded to Si is not particularly limited. It should be noted that in the silicone rubber-based curable composition, the total amount of the hydride groups in the linear organohydrogenpolysiloxane (B1) and the branched organohydrogenpolysiloxane (B2) is preferably 0.5 to 5 moles, and more preferably 1 to 3.5 moles, with respect to one mole of the vinyl groups in the vinyl group-containing linear organopolysiloxane (A1). Thus, a crosslinked network among the linear organohydrogenpolysiloxane (B1), the branched organohydrogenpolysiloxane (B2), and the vinyl group-containing linear organopolysiloxane (A1) can be reliably formed.

Silica Particles (C)

The silicone rubber-based curable composition of the present embodiment include silica particles (C).

The silica particles (C) are not particularly limited but, for example, fumed silica, calcined silica, precipitated silica, or the like is used. These may be used alone or in combination of two or more kinds thereof. The silica particles (C) may include one or more silica particles which have been surface-treated with the silane coupling agent (D).

The silica particles (C) have, for example, a specific surface area according to the BET method of, for example, 200 m²/g to 500 m²/g, preferably 220 m²/g to 400 m²/g, and more preferably 250 m²/g to 400 m²/g.

In addition, the average primary particle diameter of the silica particles (C) is, for example, preferably 1 to 100 nm, and more preferably about 5 to 20 nm.

By using the silica particles (C) having the specific surface area and the average particle diameter in those ranges, the hardness and the mechanical strength, in particular, the tensile strength of the formed silicone rubber can be improved.

Silane Coupling Agent (D)

The silicone rubber-based curable composition of the present embodiment may include a silane coupling agent (D).

The silane coupling agent (D) can have a hydrolyzable group. The hydrolyzable group is hydrolyzed with water to turn into a hydroxyl group, and the hydroxyl group undergoes a dehydrative condensation reaction with the hydroxyl group on a surface of the silica particles (C) to carry out the surface modification of the silica particles (C).

The silane coupling agent (D) can include a silane coupling agent having a hydrophobic group. As the silane coupling agent having a hydrophobic group, a silane coupling agent having a trimethylsilyl group can be used. Thus, since the hydrophobic group is provided on a surface of the silica particles (C), the aggregation force of the silica particles (C) is reduced (aggregation by hydrogen bonding due to silanol groups is reduced) in the silicone rubber-based curable composition and also in the silicone rubber, and as a result, it is presumed that the dispersibility of the silica particles in the silicone rubber-based curable composition is improved. Thus, an interface between the silica particles and the rubber matrix is increased and the reinforcing effect of the silica particles is enhanced. Further, it is presumed that the slip properties of the silica particles in the matrix are improved in a case of matrix modification of the rubber. In addition, due to the improvement of the dispersibility of the silica particles and the improvement of the slip properties, the mechanical strength (for example, a tensile strength and a tear strength) of the silicone rubber due to the silica particles is improved.

Moreover, the silane coupling agent (D) can include a silane coupling agent having a vinyl group. Thus, the vinyl group is introduced onto a surface of the silica particles (C). Therefore, in a case where the vinyl group contained in the silica particles (C) is also involved in a crosslinking reaction during formation of a network (crosslinked structure) while the silicone rubber-based curable composition is cured, and accordingly, the silica particles (C) are also captured in the network. Thus, it is possible to promote a decrease in a hardness and an increased in a modulus of a silicone rubber thus formed.

As the silane coupling agent (D), a silane coupling agent having a hydrophobic group and a silane coupling agent having a vinyl group can be used in combination. Thus, it is possible to promote a balance in the dispersibility of silica in the rubber and the crosslinkability of the rubber. The silane coupling agent (D) may be used alone or in combination of two or more kinds thereof.

Examples of the silane coupling agent (D) include one represented by Formula (4).

$$Y_n\text{—Si—}(X)_{4-n} \quad (4)$$

In Formula (4), n represents an integer of 1 to 3. Y represents any functional group having a hydrophobic group, a hydrophilic group, or a vinyl group, and in a case where n is 1, Y is the hydrophobic group, and in a case where n is 2 or 3, at least one of Y's is the hydrophobic group. X represents a hydrolyzable group.

The hydrophobic group is an alkyl group or aryl group having 1 to 6 carbon atoms, or a hydrocarbon group formed by the combination of these groups, examples thereof include a methyl group, an ethyl group, a propyl group, and a phenyl group, and the methyl group is preferable.

Examples of the hydrophilic group include a hydroxyl group, a sulfonic acid group, a carboxyl group, and a carbonyl group, and among these, the hydroxyl group is particularly preferable. Furthermore, the hydrophilic group may be included as a functional group, but is not preferably included from the viewpoint of imparting hydrophobicity to the silane coupling agent (D).

Moreover, examples of the hydrolyzable group include alkoxy groups such as a methoxy group and an ethoxy group, a chloro group, and a silazane group, and among these, the silazane group is preferable from the viewpoint of its high reactivity with the silica particles (C). Further, inclusion of the silazane group as the hydrolyzable group means inclusion of two structures of $(Y_n\text{—Si—})$ in Formula (4) from the structural characteristics.

Specific examples of the silane coupling agent (D) represented by Formula (4) are as follows.

Those having a hydrophobic group as a functional group, for example, alkoxysilanes such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, and decyltrimethoxysilane; chlorosilanes such as methyltrichlorosilane, dimethyldichlorosilane, trimethylchlorosilane, and phenyltrichlorosilane; and hexamethyldisilazane. Among these, the silane coupling agent having a trimethylsilyl group including at least one selected from the group consisting of hexamethyldisilazane, trimethylchlorosilane, trimethylmethoxysilane, and trimethylethoxysilane is preferable.

Those having a vinyl group as a functional group, for example, alkoxysilanes such as methacryloxypropyltriethoxysilane, methacryloxypropyltrimethoxysilane, methacryloxypropylmethyldiethoxysilane, methacryloxypropylmethyldimethoxysilane, vinyltriethoxysilane, vinyltrimethoxysilane, and vinylmethyldimethoxysilane; chlorosilanes such as vinyltrichlorosilane, and vinylmethyldichlorosilane; and divinyltetramethyldisilazane. Among these, the silane coupling agent having a vinyl group-containing organosilyl group including at least one selected from the group consisting of methacryloxypropyltriethoxysilane, methacryloxypropyltrimethoxysilane, methacryloxypropylmethyldiethoxysilane, methacryloxypropylmethyldimethoxysilane, divinyltetramethyldisilazane, vinyltriethoxysilane, vinyltrimethoxysilane, and vinylmethyldimethoxysilane is preferable.

In addition, in a case where the silane coupling agent (D) includes two kinds of silane coupling agents, that is, a silane coupling agent having a trimethylsilyl group and a silane coupling agent having a vinyl group-containing organosilyl group, hexamethyldisilazane is preferable as the silane coupling agent having a hydrophobic group; and divinyltetramethyldisilazane is preferable as the silane coupling agent having a vinyl group.

In a case where a silane coupling agent (D1) having a trimethylsilyl group and a silane coupling agent (D2) having a vinyl group-containing organosilyl group are used in combination, a ratio of (D1) to (D2) is not particularly limited, but the ratio (D1):(D2) in terms of weight is, for example, 1:0.001 to 1:0.35, preferably 1:0.01 to 1:0.20, and more preferably 1:0.03 to 1:0.15. By setting the ratio to such a numerical range, it is possible to obtain desired silicone rubber physical properties in the silicone rubber. Specifically, it is possible to promote a balance in the dispersibility of silica in the rubber and the crosslinkability of the rubber.

<<Platinum or Platinum Compound (E)>>

The silicone rubber-based curable composition of the present embodiment may include platinum or platinum compound (E).

The platinum or platinum compound (E) is a catalytic component that acts as a catalyst during curing. The amount of the platinum or platinum compound (E) to be added is a catalytic amount.

As the platinum or platinum compound (E), known ones can be used, and examples thereof include platinum black, those having platinum supported on silica, carbon black, or the like, chloroplatinic acid or an alcohol solution of chloroplatinic acid, a complex salt of chloroplatinic acid with an olefin, and a complex salt of chloroplatinic acid with vinyl siloxane.

Furthermore, the platinum or platinum compound (E) may be used alone or in combination of two or more kinds thereof.

Moreover, the silicone rubber-based curable composition of the present embodiment may include an organic peroxide (H).

The organic peroxide (H) is a component that acts as a catalyst during curing. The amount of the organic peroxide (H) to be added is a catalytic amount. The organic peroxide (H) can be used instead of the organohydrogenpolysiloxane (B) and the platinum or platinum compound (E), or the organohydrogenpolysiloxane (B) and the platinum or platinum compound (E) can be used in combination with the organic peroxide (H).

Examples of the organic peroxide (H) include ketone peroxides, diacyl peroxides, hydroperoxides, dialkyl peroxides, peroxyketals, alkyl peresters, peroxyesters, and peroxydicarbonates, and specific examples thereof include benzoyl peroxide, 2,4-dichlorobenzoyl peroxide, p-methylbenzoyl peroxide, o-methylbenzoyl peroxide, dicumyl peroxide, 2,5-dimethyl-bis(2,5-t-butylperoxy)

hexane, di-t-butyl peroxide, t-butyl perbenzoate, and 1,6-hexanediol-bis-t-butylperoxycarbonate.

Water (F)

Moreover, the silicone rubber-based curable composition of the present embodiment may include water (F), in addition to the components (A) to (E) and (H).

Water (F) is a component that functions as a dispersion medium for dispersing the respective components included in the silicone rubber-based curable composition and contributes to a reaction between the silica particles (C) and the silane coupling agent (D). Therefore, in the silicone rubber, the silica particles (C) and the silane coupling agent (D) can be more reliably linked to each other, which can thus exert exhibit uniform characteristics as a whole.

Furthermore, the silicone rubber-based curable composition of the present embodiment may contain known components to be blended in the silicone rubber-based curable composition, in addition to the components (A) to (F). Examples of the known components include diatomaceous earth, iron oxide, zinc oxide, titanium oxide, barium oxide, magnesium oxide, cerium oxide, calcium carbonate, magnesium carbonate, zinc carbonate, glass wool, and mica. In addition, a dispersing agent, a pigment, a dye, an antistatic agent, an antioxidant, a flame retardant, a thermal conductivity enhancing agent, or the like can be appropriately blended.

In addition, the content of each of the components in the silicone rubber-based curable composition is not particularly limited, but is set in the following manner, for example.

In the present embodiment, the upper limit of the content of the silica particles (C) may be, for example, equal to or less than 60 parts by weight, preferably equal to or less than 50 parts by weight, and more preferably equal to or less than 35 parts by weight, with respect to 100 parts by weight of the total amount of the vinyl group-containing organopolysiloxane (A). Thus, it is possible to promote a balance a mechanical strength such as a hardness and a tensile strength. In addition, the lower limit of the content of the silica particles (C) is not particularly limited, but may be, for example, equal to or more than 10 parts by weight with respect to 100 parts by weight of the total amount of the vinyl group-containing organopolysiloxane (A).

The silane coupling agent (D) is contained, for example, in a proportion of preferably equal to or more than 5 parts by weight and equal to or less than 100 parts by weight, more preferably in a proportion of equal to or more than 5 parts by weight and equal to or less than 40 parts by weight, with respect to 100 parts by weight of the vinyl group-containing organopolysiloxane (A).

Thus, the dispersibility of the silica particles (C) in the silicone rubber-based curable composition can be reliably improved.

The content of the organohydrogenpolysiloxane (B) is, for example, preferably equal to or more than 0.5 part by weight and equal to or less than 20 parts by weight, and more preferably equal to or more than 0.8 parts by weight and equal to or less than 15 parts by weight, with respect to 100 parts by weight of the total amount of the vinyl group-containing organopolysiloxane (A), the silica particles (C), and the silane coupling agent (D). In a case where the content of (B) is within the range, there is a possibility that a more effective curing reaction proceeds.

The content of the platinum or platinum compound (E) means a catalytic amount and can be appropriately set, but is specifically an amount such that the amount of the platinum group metal in the present component is 0.01 to 1,000 ppm, and preferably 0.1 to 500 ppm, with respect to 100 parts by weight of the total amount of the vinyl group-containing organopolysiloxane (A), the silica particles (C), and the silane coupling agent (D). By setting the content of the platinum or platinum compound (E) to equal to or more than the lower limit, the obtained silicone rubber composition can be sufficiently cured. By setting the content of the platinum or platinum compound (E) to equal to or less than the upper limit, the curing rate of the obtained silicone rubber composition can be improved.

The content of the organic peroxide (H) means a catalytic amount and can be appropriately set, but is specifically, for example, an amount such that the amount of the platinum group metal in this component is equal to or more than 0.001 part by weight, preferably equal to or more than 0.005 part by weight, and more preferably equal to or more than 0.01 part by weight, with respect to 100 parts by weight of the total amount of the vinyl group-containing organopolysiloxane (A), the silica particles (C), and the silane coupling agent (D). Thus, the minimum strength as a cured product can be secured. In addition, the upper limit of the content of the organic peroxide (H) is, for example, equal to or less than 10 parts by weight, preferably equal to or less than 5 parts by weight, and more preferably equal to or less than 3 parts by weight, with respect to 100 parts by weight of the total amount of the vinyl group-containing organopolysiloxane (A), the silica particles (C), and the silane coupling agent (D). Thus, the influence of by-products can be suppressed.

Furthermore, in a case where water (F) is contained, a content thereof can be appropriately set, but is specifically, for example, preferably in the range of 10 to 100 parts by weight, and more preferably in the range of 30 to 70 parts by weight, with respect to 100 parts by weight of the silane coupling agent (D). Thus, the progress of a reaction between the silane coupling agent (D) and the silica particles (C) can be more reliably made.

Method for Manufacturing Silicone Rubber

Next, the method for manufacturing a silicone rubber of the present embodiment will be described.

In the method for manufacturing a silicone rubber of the present embodiment, a silicone rubber can be obtained by preparing a silicone rubber-based curable composition and curing the silicone rubber-based curable composition.

Details thereof will be described below.

First, the respective components of the silicone rubber-based curable composition are uniformly mixed by any kneading apparatus to prepare a silicone rubber-based curable composition.

[1] For example, the vinyl group-containing organopolysiloxane (A), the silica particles (C), and the silane coupling agent (D) are weighed to predetermined amounts and then kneaded using any kneading apparatus, thereby obtaining a kneaded product containing each of these components (A), (C), and (D).

Furthermore, the kneaded product is preferably obtained by kneading the vinyl group-containing organopolysiloxane (A) and the silane coupling agent (D) in advance, and then kneading (mixing) the silica particles (C) therewith. Thus, the dispersibility of the silica particles (C) in the vinyl group-containing organopolysiloxane (A) is further improved.

In addition, in a case of obtaining the kneaded product, water (F) may be added to the kneaded product of the respective components (A), (C), and (D) as needed. Thus, the progress of a reaction between the silane coupling agent (D) and the silica particles (C) can be more reliably made.

In addition, it is preferable to knead the respective components (A), (C), and (D)) by conducting a first step of heating the components to a first temperature and a second step of heating the components to a second temperature. Thus, in the first step, the silica particles (C) can be surface-treated with the coupling agent (D), and in the second step, by-products that are produced in the reaction between the silica particles (C) and the coupling agent (D) can be reliably removed from the kneaded product. Then, the component (A) may be added to the obtained kneaded product and further kneaded as needed. Thus, the fitting among the components of the kneaded product can be improved.

The first temperature is preferably, for example, about 40° C. to 120° C., and more preferably, for example, about 60° C. to 90° C. The second temperature is preferably, for example, about 130° C. to 210° C., and more preferably, for example, about 160° C. to 180° C.

In addition, the atmosphere in the first step is preferably an inert atmosphere such as a nitrogen atmosphere, and the atmosphere in the second step is preferably an atmosphere under reduced pressure.

Further, the time in the first step is preferably, for example, about 0.3 to 1.5 hours, and more preferably about 0.5 to 1.2 hours. The time in the second step is, for example, preferably about 0.7 to 3.0 hours, and more preferably about 1.0 to 2.0 hours.

By conducting the first step and the second step under the same conditions as above, the effect can be obtained more remarkably.

[2] Next, the organohydrogenpolysiloxane (B) and the platinum or platinum compound (E) are weighed to predetermined amounts, and then the kneaded product prepared in the step [1] is kneaded with the respective components (B) and (E) using any kneading apparatus, thereby obtaining a silicone rubber-based curable composition. The obtained silicone rubber-based curable composition may be a paste including a solvent.

Furthermore, in a case where the respective components (B) and (E) are kneaded, it is preferable to knead the organohydrogenpolysiloxane (B) with the kneaded product prepared in the step [1] and knead the platinum or platinum compound (E) with the kneaded product prepared in the step [1] in advance; and then knead the respective kneaded products. Thus, the respective components (A) to (E) can be reliably dispersed in the silicone rubber-based curable composition without the progress of the reaction between the vinyl group-containing organopolysiloxane (A) and the organohydrogenpolysiloxane (B).

The temperature at which the respective components (B) and (E) are kneaded, which is a roll setting temperature, is preferably about 10° C. to 70° C., and more preferably about 25° C. to 30° C.

In addition, the kneading time is preferably about 5 minutes to 1 hour, and more preferably about 10 to 40 minutes.

By setting the temperature within the range in the steps [1] and [2], the progress of the reaction between the vinyl group-containing organopolysiloxane (A) and the organohydrogenpolysiloxane (B) can be more reliably prevented or suppressed. In addition, by setting the kneading time within the range in the steps [1] and [2], the respective components (A) to (E) can be more reliably dispersed in the silicone rubber-based curable composition.

Furthermore, the kneading apparatus used in each of the steps [1] and [2] is not particularly limited but, for example, a kneader, two rolls, a Banbury mixer (continuous kneader), a pressurization kneader, or the like can be used.

In addition, a reaction inhibitor such as 1-ethynylcyclohexanol may be added to the kneaded product in the present step [2]. Thus, even in a case where the temperature of the kneaded product is set to a relatively high temperature, the progress of the reaction between the vinyl group-containing organopolysiloxane (A) and the organohydrogenpolysiloxane (B) can be more reliably prevented or suppressed.

In addition, in the present step [2], the organic peroxide (H) may be added instead of the organohydrogenpolysiloxane (B) and the platinum or the platinum compound (E), or in combination with the organohydrogenpolysiloxane (B) and the platinum or the platinum compound (E). Preferred conditions such as a temperature and a time during the kneading of the organic peroxide (H), and a device to be used are the same as those with the conditions for kneading the organohydrogenpolysiloxane (B) and the platinum or platinum compound (E).

[3] Next, a silicone rubber is formed by curing the silicone rubber-based curable composition.

In the present embodiment, the curing step of the silicone rubber-based curable composition is conducted by, for example, heating at 100° C. to 250° C. for 1 to 30 minutes (primary curing) and then post-baking at 200° C. for 1 to 4 hours (secondary curing).

By conducting the steps as described above, the silicone rubber (cured product of silicone rubber-based curable composition) of the present embodiment can be obtained.

The method for manufacturing a structure of the present embodiment may be configured to have a step of curing the silicone rubber-based curable composition and a step of obtaining a structure including a cured product of the silicone rubber-based curable composition.

In the step of obtaining such a structure, the structure may be the wearable device.

Although the embodiments of the present invention have been described above, these are examples of the present invention and various configurations other than those can be adopted. In addition, the present invention is not limited to the above-described embodiments, and modifications, improvements, and the like within a scope in which the object of the present invention can be accomplished are included in the present invention.

Hereinafter, examples of reference forms will be added.

1. A silicone rubber-based curable composition including:
   an organopolysiloxane including a vinyl group-containing organopolysiloxane (A), and
   an inorganic filler including silica particles (C),
   in which in a $^1$H-NMR spectrum of the silicone rubber-based curable composition obtained in accordance with the following procedure, a first peak derived from a vinyl group is present,
   the vinyl group index in the silicone rubber-based curable composition, as calculated in accordance with the following procedure, is equal to or less than $3.5 \times 10^{-1}$% by mole, and
   a content of the inorganic filler is equal to or more than 5 parts by weight and equal to or less than 60 parts by weight with respect to 100 parts by weight of the organopolysiloxane.

Procedure

A $^1$H-NMR spectrum is obtained using a sample prepared from the silicone rubber-based curable composition.

Based on the obtained $^1$H-NMR spectrum, an integrated value (P1) of the first peak derived from a vinyl group and an integrated value (P2) of the second peak derived from a methyl group are calculated, and the vinyl group index (% by mole) is calculated from a formula: P1/(P1+(P2−P1)/2)]×100, using the calculated integrated values P1 and P2.

2. The silicone rubber-based curable composition as described in 1.,
in which the vinyl group index is equal to or more than $1.0 \times 10^{-3}$% by mole.

3. The silicone rubber-based curable composition as described in 1. or 2.,
in which a content of the inorganic filler is equal to or more than 10 parts by weight and equal to or less than 35 parts by weight with respect to 100 parts by weight of the organopolysiloxane.

4. The silicone rubber-based curable composition as described in any one of 1. to 3.,
in which in a case where the vinyl group index in the vinyl group-containing organopolysiloxane (A) is Cv (% by mole) and a weight-average molecular weight of the vinyl group-containing organopolysiloxane (A) is M×10$^6$,
Cv and M satisfy $1.0 \times 10^{-3} \leq Cv/M \leq 1.5$.

5. The silicone rubber-based curable composition as described in any one of 1. to 4.,
in which a specific surface area of the inorganic filler, as measured by a BET method, is equal to or more than 30 m$^2$/g and equal to or less than 500 m$^2$/g.

6. The silicone rubber-based curable composition as described in any one of 1. to 5.,
in which a tear strength of the silicone rubber-based curable composition, as measured under the following conditions, is equal to or more than 25 N/mm.

Measurement Conditions for Tear Strength

A crescent-shaped test piece is manufactured using a cured product of the silicone rubber-based curable composition, and for the obtained crescent-shaped test piece, a tear strength is measured at 25° C. in accordance with JIS K 6252 (2001).

7. The silicone rubber-based curable composition as described in any one of 1. to 6.,
in which an elongation at break of a cured product of the silicone rubber-based curable composition, as measured under the following conditions, is equal to or more than 500%.

Measurement Conditions for Elongation at Break

A dumbbell-shaped type-3 test piece is manufactured in accordance with JIS K 6251 (2004), using the cured product of the silicone rubber-based curable composition, and an elongation at break of the obtained dumbbell-shaped type-3 test piece is measured at 25° C. The elongation at break is calculated by [Moving distance (mm) between chucks]÷[Initial distance (60 mm) between chucks]×100. The unit is %.

8. The silicone rubber-based curable composition as described in any one of 1. to 7.,
in which a durometer hardness A of a cured product of the silicone rubber-based curable composition, as measured under the following conditions, is equal to or more than 10 and equal to or less than 60.

Measurement Conditions for Durometer Hardness A

A sheet-shaped test piece is manufactured using the cured product of the silicone rubber-based curable composition, and for the obtained sheet-shaped test piece, the durometer hardness A is measured at 25° C. in accordance with JIS K 6253 (1997).

9. The silicone rubber-based curable composition as described in any one of 1. to 8.,
in which the silicone rubber-based curable composition is used to form a molded product for an stretchable member.

10. The silicone rubber-based curable composition as described in any one of 1. to 9.,
in which the silicone rubber-based curable composition is used to form a molded product for a wearable device.

11. A structure including a cured product of the silicone rubber-based curable composition as described in any one of 1. to 10.

EXAMPLES

Hereinafter, the present invention will be described in detail with reference to Examples, but the present invention is not limited to the description of these Examples.

Raw material components used in Examples and Comparative Examples shown in Table 1 are shown below.

Organopolysiloxane: Vinyl Group-Containing Organopolysiloxane (A)

Low-content vinyl group-containing linear organopolysiloxane (A1-1a): A vinyl group-containing dimethylpolysiloxane synthesized by a synthesis scheme 1 (a structure represented by Formula (1-1), in which only R$^1$ (terminal) is a vinyl group)

Low-content vinyl group-containing linear organopolysiloxane (A1-1b): A vinyl group-containing dimethylpolysiloxane synthesized by a synthesis scheme 2 (a structure represented by Formula (1-1), in which only R$^1$ (terminal) is a vinyl group)

Low-content vinyl group-containing linear organopolysiloxane (A1-1c): A vinyl group-containing dimethylpolysiloxane synthesized by a synthesis scheme 3 (a structure represented by Formula (1-1), in which only R$^1$ (terminal) is a vinyl group)

High-content vinyl group-containing linear organopolysiloxane (A1-2a): A vinyl group-containing dimethylpolysiloxane synthesized by a synthesis scheme 4 (a structure represented by Formula (1-1), in which R$^1$ (terminal) and R$^2$ (in a chain) are vinyl groups)

High-content vinyl group-containing linear organopolysiloxane (A1-2b): A vinyl group-containing dimethylpolysiloxane synthesized by a synthesis scheme 5 (a structure represented by Formula (1-1), in which R$^1$ (terminal) and R$^2$ (in a chain) are vinyl groups)

High-content vinyl group-containing linear organopolysiloxane (A1-2c): A vinyl group-containing dimethylpolysiloxane synthesized by a synthesis scheme 6 (a structure represented by Formula (1-1), in which R$^1$ (terminal) and R$^2$ (in a chain) are vinyl groups)

High-content vinyl group-containing linear organopolysiloxane (A1-2d): A vinyl group-containing dimethylpolysiloxane synthesized by a synthesis scheme 7 (a structure represented by Formula (1-1), in which R$^1$ (terminal) and R$^2$ (in a chain) are vinyl groups)

Organopolysiloxane: Organopolysiloxane Including No Vinyl Group

Organopolysiloxane including no vinyl group: A linear organopolysiloxane including no vinyl group, synthesized by Synthesis Scheme 8.

Organohydrogenpolysiloxane (B)

Manufactured by Momentive Inc.: "TC-25D"

Silica Particles (C)

Silica particles (C-1): Silica fine particles (particle size 7 nm, specific surface area 300 m²/g), manufactured by Nippon Aerosil Co., Ltd., "AEROSIL 300"

Silane Coupling Agent (D)

Silane coupling agent (D-1): Hexamethyldisilazane (HMDZ), manufactured by Gelest, Inc., "HEXAMETHYL-DISILAZANE (SIH 6110.1)"

Silane coupling agent (D-2): Divinyltetramethyldisilazane, manufactured by Gelest, Inc., "1,3-DIVINYLTE-TRAMETHYLDISILAZANE (SID4612.0)"

Platinum or Platinum Compound (E)

Manufactured by Momentive Inc.: "TC-25A"

Synthesis of Vinyl Group-Containing Organopolysiloxane (A)

Synthesis Scheme 1: Synthesis of Low-Content Vinyl Group-Containing Linear Organopolysiloxane (A1-1a)

A low-content vinyl group-containing linear organopolysiloxane (A1-1a) was synthesized according to Formula (5).

That is, 74.7 g (252 mmol) of octamethylcyclotetrasiloxane and 0.1 g of potassium siliconate were put into a 300 mL separable flask having a cooling pipe and a stirring blade, of which the inside had been replaced by Ar gas, and the mixture was warmed and stirred at 120° C. for 30 minutes. Further, at this time, it could be confirmed that the viscosity increased.

Thereafter, the mixture was warmed to 155° C. and continued to be stirred for 4 hours. Further, after 3 hours, 0.1 g (0.6 mmol) of 1,3-divinyltetramethyldisiloxane was added thereto, followed by further stirring at 155° C. for 4 hours.

In addition, after 4 hours, the mixture was diluted with 250 mL of toluene and then washed with water three times. The organic layer after washing was purified by reprecipitation by washing with 1.5 L of methanol several times, and the oligomer and the polymer were separated. The obtained polymer was dried under reduced pressure at 60° C. overnight to obtain a low-content vinyl group-containing linear organopolysiloxane (A1-1a).

Synthesis Scheme 2: Synthesis of Low-Content Vinyl Group-Containing Linear Organopolysiloxane (A1-1b)

A low-content vinyl group-containing linear organopolysiloxane (A1-1b) was synthesized in the same manner as in the synthesis step for (A1-1a), except that the reaction time after raising the temperature to 155° C. was changed to 3.5 hours in the synthesis step for (A1-1a).

Synthesis Scheme 3: Synthesis of Low-Content Vinyl Group-Containing Linear Organopolysiloxane (A1-1c)

A low-content vinyl group-containing linear organopolysiloxane (A1-1c) was synthesized in the same manner as in the synthesis step for (A1-1a), except that the reaction time after raising the temperature to 155° C. was changed to 3 hours in the synthesis step for (A1-1a).

[Synthesis Scheme 4: Synthesis of High-Content Vinyl Group-Containing Linear Organopolysiloxane (A1-2a)]

A vinyl group-containing linear organopolysiloxane (A1-2a) was synthesized as shown in Formula (6) in the same manner as in the synthesis step for (A1-1c), except that 0.12 g (0.35 mmol) of 2,4,6,8-tetramethyl 2,4,6,8-tetravinylcyclotetrasiloxane was used in addition to 75.3 g (254 mmol) of octamethylcyclotetrasiloxane in the synthesis step for (A1-1c).

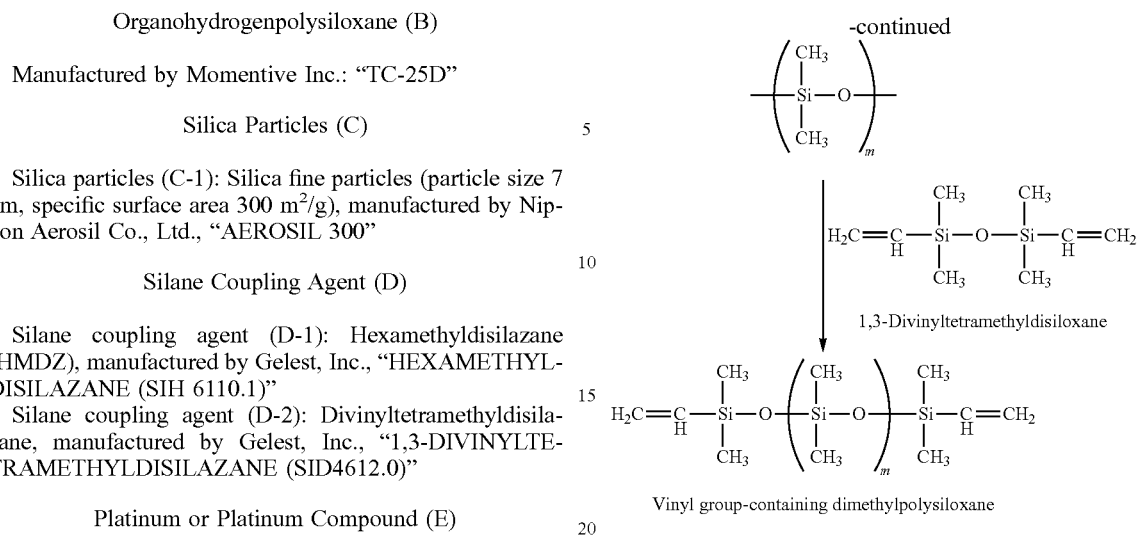

Formula (5)

Formula (6)

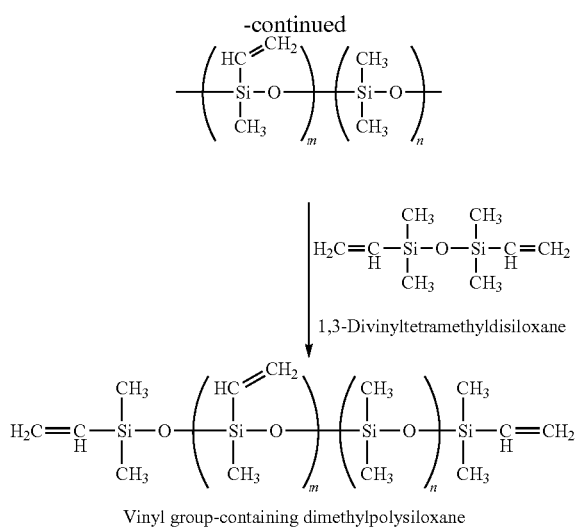

Vinyl group-containing dimethylpolysiloxane

Synthesis Scheme 5: Synthesis of High-Content Vinyl Group-Containing Linear Organopolysiloxane (A1-2b)

A high-content vinyl group-containing linear organopolysiloxane (A1-2b) was synthesized in the same manner as in the synthesis step for (A1-2a), except that the amount of 2,4,6,8-tetramethyl 2,4,6,8-tetravinylcyclotetrasiloxane to be added was changed to 0.19 g (0.55 mmol) in the synthesis step for (A1-2a).

Synthesis Scheme 6: Synthesis of High-Content Vinyl Group-Containing Linear Organopolysiloxane (A1-2c)

A high-content vinyl group-containing linear organopolysiloxane (A1-2c) was synthesized in the same manner as in the synthesis step for (A1-2a), except that the amount of octamethylcyclotetrasiloxane to be added was changed to 74.7 g (252 mmol), and the amount of 2,4,6,8-tetramethyl 2,4,6,8-tetravinylcyclotetrasiloxane to be added was changed to 0.86 g (2.5 mmol) in the synthesis step for (A1-2a).

Synthesis Scheme 7: Synthesis of High-Content Vinyl Group-Containing Linear Organopolysiloxane (A1-2d)

A high-content vinyl group-containing linear organopolysiloxane (A1-2d) was synthesized in the same manner as in the synthesis step for (A1-2a), except that the amount of octamethylcyclotetrasiloxane to be added was changed to 73.2 g (247 mmol), and the amount of 2,4,6,8-tetramethyl 2,4,6,8-tetravinylcyclotetrasiloxane to be added was changed to 2.61 g (7.6 mmol) in the synthesis step for (A1-2a).

Synthesis Scheme 8: Synthesis of Linear Organopolysiloxane Including No Vinyl Group A linear organopolysiloxane including no vinyl group was synthesized in the same manner as in the synthesis step for (A1-1a), except that 0.1 g (0.6 mmol) of hexamethyldisiloxane was added instead of 0.1 g (0.6 mmol) of 1, 3-divinyltetramethyldisiloxane in the synthesis step for (A1-1a).

Preparation of Silicone Rubber-Based Curable Composition

Examples 1 to 6 and Comparative Examples 1 and 2

A mixture of the vinyl group-containing organopolysiloxane (A), the silane coupling agent (D), and water (F) was kneaded in advance at a ratio shown in Table 1 below, silica particles (C) were then added thereto, and the mixture was further kneaded to obtain a kneaded product (silicone rubber compound).

Here, the kneading after the addition of the silica particles (C) was carried out by conducting a first step of kneading the mixture for 1 hour under the condition of 60° C. to 90° C. in a nitrogen atmosphere for a coupling reaction and a second step of kneading the mixture for 2 hours under the condition of 160° C. to 180° C. in an atmosphere with reduced pressure in order to remove by-products (ammonia), followed by cooling and kneading for 20 minutes.

Subsequently, the organohydrogenpolysiloxane (B) (TC-25D) and the platinum or platinum compound (E) (TC-25A) at a ratio shown in Table 1 below were added to 100 parts by weight of the obtained kneaded product (silicone rubber compound), and the mixture was kneaded with a roll to obtain a silicone rubber-based curable composition.

Comparative Example 3

A silicone rubber-based curable composition was obtained in the same manner as in Example 3, except that the vinyl group-containing organopolysiloxane (A) was changed to an organopolysiloxane including no vinyl group.

TABLE 1

| | | | | Unit | Example 1 | Example 2 | Example 3 | Example 4 | Example 5 |
|---|---|---|---|---|---|---|---|---|---|
| Silicon rubber-based curable composition | Silicone rubber compound (kneaded product) | Vinyl group-containing organopoly-siloxane (A) | A1-1a | Parts by weight | 100 | 2 | 2 | 0 | 0 |
| | | | A1-1c | | 0 | 98 | 98 | 0 | 0 |
| | | | A1-2a | | 0 | 0 | 0 | 0 | 0 |
| | | | A1-2c | | 0 | 0 | 0 | 0 | 0 |
| | | | A1-1b | | 0 | 0 | 0 | 90 | 90 |
| | | | A1-2b | | 0 | 0 | 0 | 0 | 0 |
| | | | A1-2d | | 0 | 0 | 0 | 10 | 10 |
| | | Organopolysiloxane including no vinyl group | | | 0 | 0 | 0 | 0 | 0 |
| | | Silica particles (C) | C-1 | Parts by weight | 50 | 50 | 25 | 50 | 25 |
| | | Silane coupling agent (D) | D-1 | | 9.5 | 9.5 | 10 | 9.5 | 10 |
| | | | D-2 | | 1.0 | 1.0 | 0.5 | 1.0 | 0.5 |
| | | Water (F) | | | 5.25 | 5.25 | 5.25 | 5.25 | 5.25 |
| | Additive | Crosslinking | Organohydro- | Parts by | 4.5 | 4.5 | 1.25 | 4.5 | 5.28 |

TABLE 1-continued

| | | | | | | | | | |
|---|---|---|---|---|---|---|---|---|---|
| | agent | genpolysiloxane (B) | weight with respect to | | | | | | |
| | Catalytic | Platinum or platinum compound (E) | 100 parts by weight of kneaded product | 0.5 | 0.5 | 0.5 | 0.5 | 0.5 |
| Evaluation | Vinyl group index in silicone rubber-based curable composition | | % by mole | 0.003 | 0.005 | 0.005 | 0.278 | 0.281 |
| | First peak derived from vinyl group in NMR spectrum | | | Present | Present | Present | Present | Present |
| | Mw | | | 3.0.E+05 | 2.2.E+05 | 2.2.E+05 | 2.7.E+05 | 2.7.E+05 |
| | Mn | | | 6.2.E+05 | 4.8.E+05 | 4.8.E+05 | 5.3.E+05 | 5.3.E+05 |
| | Type A durometer hardness | | | 50.0 | 49.6 | 22.7 | 62.4 | 42.0 |
| | Tear strength | | N/mm | 46.2 | 44.9 | 37.7 | 52.4 | 35.7 |
| | Tensile strength | | MPa | 12.4 | 13.2 | 14.3 | 10.7 | 8.2 |
| | Elongation at break | | % | 891 | 880 | 1442 | 783 | 955 |
| | Ease of deformation | | | B | B | A | B | A |
| | Presence or absence of damage during bending deformation | | | B | B | B | B | B |

| | | | | Unit | Example 6 | Comparative Example 1 | Comparative Example 2 | Comparative Example 3 |
|---|---|---|---|---|---|---|---|---|
| Silicon rubber-based curable composition (kneaded product) | Silicone rubber compound | Vinyl group-containing organopoly-siloxane (A) | A1-1a | Parts by weight | 0 | 0 | 0 | 0 |
| | | | A1-1c | | 0 | 60 | 0 | 0 |
| | | | A1-2a | | 0 | 0 | 50 | 0 |
| | | | A1-2c | | 0 | 40 | 50 | 0 |
| | | | A1-1b | | 80 | 0 | 0 | 0 |
| | | | A1-2b | | 14 | 0 | 0 | 0 |
| | | | A1-2d | | 6 | 0 | 0 | 0 |
| | | Organopolysiloxane including no vinyl group | | | 0 | 0 | 0 | 100 |
| | | Silica particles (C) | C-1 | Parts by weight | 50 | 25 | 35 | 25 |
| | | Silane coupling agent (D) | D-1 | | 9.5 | 7.5 | 10 | 10 |
| | | | D-2 | | 1.0 | 3.0 | 0.5 | 0.5 |
| | | Water (F) | | | 5.25 | 5.25 | 5.25 | 5.25 |
| | Additive | Crosslinking agent | Organohydro-genpolysiloxane (B) | Parts by weight with respect to | 3.8 | 3 | 3.77 | 1.25 |
| | | Catalytic | Platinum or platinum compound (E) | 100 parts by weight of kneaded product | 0.5 | 0.5 | 0.5 | 0.5 |
| Evaluation | Vinyl group index in silicone rubber-based curable composition | | % by mole | 0.201 | 0.362 | 0.507 | 0.000 |
| | First peak derived from vinyl group in NMR spectrum | | | Present | Present | Present | Absent |
| | Mw | | | 2.7.E+05 | 2.2.E+05 | 2.4.E+05 | 3.4.E+05 |
| | Mn | | | 5.2.E+05 | 4.8.E+05 | 5.0.E+05 | 5.9.E+05 |
| | Type A durometer hardness | | | 61.0 | 28.7 | 44.6 | — |
| | Tear strength | | N/mm | 53.7 | 17.7 | 29.0 | — |
| | Tensile strength | | MPa | 11.4 | 5.3 | 9.0 | — |
| | Elongation at break | | % | 790 | 540 | 388 | — |
| | Ease of deformation | | | B | A | B | — |
| | Presence or absence of damage during bending deformation | | | B | C | C | — |

In Table 1, "-" indicates that since the silicone rubber-based curable composition was not sufficiently cured and sufficient mechanical strength could thus not be obtained, the silicone rubber-based curable composition could not be evaluated.

Measurement of Vinyl Group Index

The silicone rubber-based curable composition obtained in each of Examples and Comparative Examples was used as a sample.

The sample was put into the following measurement solvent to prepare a solution at the following sample concentration.

The obtained solution was left to stand overnight or longer in an environment of room temperature (25° C.)

The solution that had been left to stand was stirred or sonicated at 50° C. for 2 hours or longer to obtain a measurement solution in which the sample was dissolved in the measurement solvent.

A $^1$H-NMR spectrum was obtained according to the following measurement conditions, using the obtained measurement solution.

Based on the obtained spectrum, the presence or absence of the first peak derived from the vinyl group was confirmed, and an integrated value (P1) of the first peak (5.6 to 6.0 ppm)

derived from the vinyl group and an integrated value (P2) of the second peak (−0.1 to 0.1 ppm) derived from the methyl group were calculated.

The vinyl group index (% by mole) in the silicone rubber-based curable composition was calculated from the formula: [P1/(P1+(P2−P1)/2)]×100, using the calculated integrated values P1 and P2. The results are shown in Table 1.

Device: JEOL JNM-ECA 400 FT-NMR device
Measurement solvent: Deuterated chloroform
Sample concentration: About 5%
Measurement temperature: 40° C.
Cumulative number of times: 1024
Reference peak: Chloroform is set to 7.26 ppm GPC Measurement of Organopolysiloxane Based on the following method, the weight-average molecular weight Mw and the number-average molecular weight Mn of the organosiloxane were measured.

As a measurement sample, a simple substance of the vinyl group-containing organopolysiloxane (A), a simple substance of the organopolysiloxane including no vinyl group, or a mixture of (A) mixed at a blending ratio shown in Table 1 was used.

For the weight-average molecular weight (Mw) and the number-average molecular weight (Mn), polystyrene-equivalent values obtained from a calibration curve of standard polystyrene (PS) obtained by GPC measurement were used. The results are shown in Table 1.

The measurement conditions are as follows.

GPC measuring apparatus: Gel permeation chromatography device, HLC-8320 GPC manufactured by Tosoh Corporation
Column: TSK Guardcolumn Super H-H+TSKgel Super HM-M×2+TSKgel Super H2000×1, manufactured by Tosoh Corporation
Detector: RI detector for liquid chromatogram
Measurement temperature: 40° C.
Solvent: Chloroform
Sample concentration in measurement solution: 1.0 mg/ml The obtained silicone rubber-based curable compositions of Examples and Comparative Examples were evaluated based on the following evaluation items. The results are shown in Table 1.

Manufacture of Silicone Rubber

The obtained silicone rubber-based curable composition was pressed at 150° C. and 10 MPa for 20 minutes to form a sheet having a thickness of 1 mm while performing a primary curing. Subsequently, the composition was heated at 200° C. for 4 hours to perform a secondary curing.

Thus, a sheet-shaped silicone rubber (a cured product of the silicone rubber-based curable composition) was obtained.

Using two samples, a hardness was measured at n=5 in each sample, and an average value of a total of ten measurements was taken as the measured value. A tensile stress and an elongation at break were measured with three samples, and an average value from the three measurements was taken as the measured value. A tear strength was measured with five samples, and an average value of the five measurements was taken as the measured value.

The respective average values are shown in Table 1.

Hardness

Six sheets of the obtained sheet-shaped silicone rubber having a thickness of 1 mm were laminated to prepare a test piece having a thickness of 6 mm. A type A durometer hardness of the obtained test piece was measured at 25° C. in accordance with JIS K 6253 (1997).

Tear Strength

A crescent-shaped test piece was manufactured in accordance with JIS K 6252 (2001) using the obtained sheet-shaped silicone rubber having a thickness of 1 mm, and a tear strength of the obtained crescent-shaped test piece was measured at 25° C. The unit is N/mm.

Tensile Strength

A dumbbell-shaped type-3 test piece was manufactured in accordance with JIS K 6251 (2004) using the obtained sheet-shaped silicone rubber having a thickness of 1 mm, and a tensile strength of the obtained dumbbell-shaped type-3 test piece was measured at 25° C. The unit is MPa.

Elongation at Break

A dumbbell-shaped type-3 test piece was manufactured in accordance with JIS K 6251 (2004) using the obtained sheet-shaped silicone rubber having a thickness of 1 mm, and an elongation at break of the obtained dumbbell-shaped type-3 test piece was measured at 25° C. The elongation at break was calculated by [Moving distance (mm) between chucks]÷[Initial distance (60 mm) between chucks]×100. The unit is %.

Evaluation of Ease of Deformation

A sheet having a thickness of 1 mm×length: 80 mm×width: 80 mm was created by subjecting the silicone rubber-based curable composition obtained in each of Examples and each of Comparative Examples to a curing under the conditions of 170° C. for 5 minutes and 200° C. for 4 hours.

The obtained sheet was sewn on an elbow portion of a long-sleeved T-shirt (clothes) with a thread to prepare a test sample.

An elbow bending test was carried out on a subject wearing a long-sleeved T-shirt which was a test sample.

Specifically, the ease of deformation of the silicone rubber sheet was determined, based on the ease of bending and a bending angle of the elbow from the start of bending to the end of bending. During the elbow bending test, the silicone rubber sheet that did not feel a load in a case where the elbow was bent was marked with A, the silicone rubber sheet that felt a slight load in a case where the elbow was bent was marked with B, and the silicone rubber sheet that felt a load in a case where the elbow was bent was marked with C.

Evaluation of Damage During Bending Deformation

A sheet having a thickness: 0.3 mm×length: 80 mm×width: 80 mm was created by subjecting the silicone rubber-based curable composition obtained in each of Examples and each of Comparative Examples to a curing under the conditions of 170° C. for 5 minutes and 200° C. for 4 hours.

The obtained sheet was sewn on an elbow portion of a long-sleeved T-shirt (clothes) with a thread to prepare a test sample.

An elbow bending test was carried out on a subject wearing a long-sleeved T-shirt which was a test sample. Specifically, the silicone rubber sheet that was not damaged in a case where the elbow was bent and stretched 50 times was marked with B, and the silicone rubber sheet that was damaged was marked with C.

It was found that the silicone rubber-based curable compositions of Examples 1 to 6 can realize a molded product having excellent bending durability during repeated bending, as compared with Comparative Examples 1 and 2, and can thus realize a molded product having excellent mechanical strength, as compared with Comparative Example 3. Since the molded products of the silicone rubber-based curable compositions of Examples 1 to 6 are also excellent in ease of deformation, the molded products can be suitably used for a bendable member, preferably a wearable device, and more preferably a substrate mountable on clothes in a wearable device.

This application claims priority based on Japanese application Japanese Patent Application No. 2019-042425 filed on Mar. 8, 2019, the contents of all of which are hereby incorporated by reference in their entireties.

What is claim is:

1. A silicone rubber-based curable composition comprising:
    an organopolysiloxane including a vinyl group-containing organopolysiloxane (A);
    an inorganic filler including silica particles (C),
    a silane coupling agent (D) including a silane coupling agent (D1) having a trimethylsilyl group and a silane coupling agent (D2) having a vinyl group-containing organosilyl group, and
    platinum or platinum compound (E),
    wherein a content of the inorganic filler is equal to or more than 5 parts by weight and equal to or less than 60 parts by weight with respect to 100 parts by weight of the organopolysiloxane,
    wherein a ratio (D1):(D2) in terms of weight is 1:0.001 to 1:0.35,
    wherein in a $^1$H-NMR spectrum of the silicone rubber-based curable composition obtained in accordance with the following procedure, a first peak derived from a vinyl group is present,
    a vinyl group index in the silicone rubber-based curable composition, as calculated in accordance with the following procedure A, is equal to or less than $2.0 \times 10^{-1}$% by mole
    procedure A:
    a $^1$H-NMR spectrum is obtained using a sample prepared from the silicone rubber-based curable composition, and
    based on the obtained $^1$H-NMR spectrum, an integrated value (P1) of the first peak derived from a vinyl group and an integrated value (P2) of the second peak derived from a methyl group are calculated, and the vinyl group index (% by mole) is calculated from a formula: $P1/(P1+(P2-P1)/2)] \times 100$, using the calculated integrated values P1 and P2, and
    wherein an elongation at break of a cured product of the silicone rubber-based curable composition, as measured under the following conditions procedure B, is equal to or more than 800%:
    procedure B:
    a dumbbell-shaped type-3 test piece is manufactured in accordance with JIS K6251 (2004), using the cured product of the silicone rubber-based curable composition, and an elongation at break of the obtained dumbbell-shaped type-3 test piece is measured at 25° C., the elongation at break being calculated by [Moving distance (mm) between chucks]÷[Initial distance (60 mm) between chucks]×100, and the unit is %.

2. The silicone rubber-based curable composition according to claim 1,
    wherein the vinyl group index is equal to or more than $1.0 \times 10^{-3}$% by mole.

3. The silicone rubber-based curable composition according to claim 1,
    wherein a content of the inorganic filler is equal to or more than 10 parts by weight and equal to or less than 35 parts by weight with respect to 100 parts by weight of the organopolysiloxane.

4. The silicone rubber-based curable composition according to claim 1,
    wherein in a case where the vinyl group index in the vinyl group-containing organopolysiloxane (A) is Cv (% by mole) and a weight-average molecular weight of the vinyl group-containing organopolysiloxane (A) is $M \times 10^6$,
    Cv and M satisfy $1.0 \times 10^{-3} \leq Cv/M \leq 1.5$.

5. The silicone rubber-based curable composition according to claim 1,
    wherein a specific surface area of the inorganic filler, as measured by a BET method, is equal to or more than 200 m$^2$/g and equal to or less than 500 m$^2$/g.

6. The silicone rubber-based curable composition according to claim 1,
    wherein a tear strength of the silicone rubber-based curable composition, as measured under the following procedure C, is equal to or more than 25 N/mm:
    procedure C:
    a crescent-shaped test piece is manufactured using a cured product of the silicone rubber-based curable composition, and for the obtained crescent-shaped test piece, a tear strength is measured at 25° C. in accordance with JIS K6252 (2001).

7. The silicone rubber-based curable composition according to claim 1,
    wherein a durometer hardness A of a cured product of the silicone rubber-based curable composition, as measured under the following procedure D, is equal to or more than 10 and equal to or less than 60:
    procedure D:
    a sheet-shaped test piece is manufactured using the cured product of the silicone rubber-based curable composition, and for the obtained sheet-shaped test piece, the durometer hardness A is measured at 25° C. in accordance with JIS K6253 (1997).

8. The silicone rubber-based curable composition according to claim 1,
    wherein a tensile strength of a cured product of the silicone rubber-based curable composition, as measured under the following procedure E, is equal to or more than 5.0 MPa:
    procedure E:
    a dumbbell-shaped type-3 test piece is manufactured using the cured product of the silicone rubber-based curable composition, and for the obtained dumbbell-shaped type-3 test piece, the tensile strength is measured at 25° C. in accordance with JIS K6251 (2004).

9. The silicone rubber-based curable composition according to claim 1,
wherein the vinyl group-containing organopolysiloxane (A) includes a vinyl group-containing linear organopolysiloxane (A1) represented by General Formula (1-1),

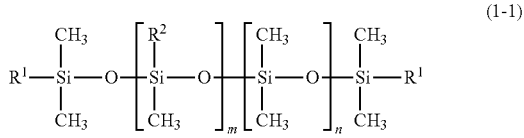

(1-1)

(in General Formula (1-1), $R^1$ is a vinyl group, $R^2$ is a methyl group or a vinyl group, m is an integer of 0 to 2,000, and n is an integer of 1,000 to 10,000).

10. The silicone rubber-based curable composition according to claim 1,
wherein the vinyl group index in the silicone rubber-based curable composition is equal to or less than $1.0 \times 10^{-1}$% by mole.

11. A structure comprising a cured product of the silicone rubber-based curable composition according to claim 1.

12. A wearable device comprising a clothes mounting section mountable on clothes,
wherein a clothes mounting section is formed of a cured product of the silicone rubber-based curable composition according to claim 1.

13. A method for manufacturing a structure, comprising:
a step of curing the silicone rubber-based curable composition according to claim 1; and
a step of obtaining a structure including a cured product of the silicone rubber-based curable composition.

14. The method for manufacturing a structure according to claim 13,
wherein the structure is a wearable device in the step of obtaining a structure.

15. The silicone rubber-based curable composition according to claim 1,
wherein does not include an organic peroxide (H).

* * * * *